(12) United States Patent
Strengert et al.

(10) Patent No.: US 9,248,812 B2
(45) Date of Patent: Feb. 2, 2016

(54) CONTROL DEVICE FOR A BRAKING SYSTEM OF A VEHICLE, BRAKING SYSTEM, AND METHOD FOR OPERATING A BRAKING SYSTEM FOR A VEHICLE

(75) Inventors: Stefan Strengert, Stuttgart (DE); Dirk Drotleff, Oberstenfeld (DE); Michael Kotitschke, Bad Friedrichshall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 150 days.

(21) Appl. No.: 13/982,130

(22) PCT Filed: Nov. 29, 2011

(86) PCT No.: PCT/EP2011/071250
§ 371 (c)(1),
(2), (4) Date: Oct. 7, 2013

(87) PCT Pub. No.: WO2012/100864
PCT Pub. Date: Aug. 2, 2012

(65) Prior Publication Data
US 2014/0032071 A1     Jan. 30, 2014

(30) Foreign Application Priority Data
Jan. 26, 2011  (DE) .......................... 10 2011 003 144

(51) Int. Cl.
*B60T 8/17*     (2006.01)
*B60L 3/00*     (2006.01)
(Continued)

(52) U.S. Cl.
CPC ................. *B60T 8/17* (2013.01); *B60L 3/0023* (2013.01); *B60L 7/18* (2013.01); *B60L 7/26* (2013.01);
(Continued)

(58) Field of Classification Search
CPC ..... B60L 3/0023; B60L 7/26; B60L 2240/12; B60L 7/18; B60L 2240/461; B60T 7/042; B60T 8/17; B60T 8/4872; B60T 8/885; B60T 13/662; B60T 13/686; B60T 2270/402; B60T 2270/403; B60T 8/4072
USPC ........................................................... 701/70
See application file for complete search history.

(56) References Cited

U.S. PATENT DOCUMENTS 5,496,099 A * 3/1996 Resch .......................... 303/114.1
6,164,734 A * 12/2000 Otomo ..................... B60T 7/042
                                                            188/1.11 E (Continued)

FOREIGN PATENT DOCUMENTS

CN     101386295       3/2009
CN     101909957       12/2010
(Continued)

*Primary Examiner* — Tuan C. To
(74) *Attorney, Agent, or Firm* — Kenyon & Kenyon LLP

(57) ABSTRACT

A control device for a braking system of a vehicle, with the aid of which at least one provided setpoint variable regarding a setpoint brake pressure to be set in a first brake circuit and at least one provided actual variable regarding an actual brake pressure that is present in the first brake circuit, and/or an elasticity variable regarding an elasticity of a second brake circuit of the braking system are receivable, and a default variable regarding a setpoint additional volume of a brake fluid of the second brake circuit which is in a main cylinder braking mode is establishable, by taking into account a first deviation variable of the at least one actual variable from the at least one setpoint variable, and/or a second deviation variable of the elasticity variable from a predefined setpoint elasticity variable, so that a control signal corresponding to the established default variable is outputtable to at least one volume conveying device. Moreover, also described is a method for operating a braking system for a vehicle.

14 Claims, 4 Drawing Sheets

(51) Int. Cl.
*B60L 7/18* (2006.01)
*B60L 7/26* (2006.01)
*B60T 7/04* (2006.01)
*B60T 8/40* (2006.01)
*B60T 8/48* (2006.01)
*B60T 8/88* (2006.01)
*B60T 13/66* (2006.01)
*B60T 13/68* (2006.01)

(52) U.S. Cl.
CPC ............... *B60T 7/042* (2013.01); *B60T 8/4072* (2013.01); *B60T 8/4872* (2013.01); *B60T 8/885* (2013.01); *B60T 13/662* (2013.01); *B60T 13/686* (2013.01); *B60L 2240/12* (2013.01); *B60L 2240/461* (2013.01); *B60T 2270/402* (2013.01); *B60T 2270/403* (2013.01)

(56) References Cited

U.S. PATENT DOCUMENTS

| | | | | |
|---|---|---|---|---|
| 6,206,490 | B1 * | 3/2001 | Tozu et al. | 303/168 |
| 6,244,672 | B1 | 6/2001 | Hachtel | |
| 6,322,165 | B1 * | 11/2001 | Klein et al. | 303/119.2 |
| 6,328,390 | B1 * | 12/2001 | Tozu et al. | 303/113.5 |
| 6,422,662 | B1 * | 7/2002 | Haas | B60T 8/4059 |
| | | | | 303/113.4 |
| 6,522,966 | B2 * | 2/2003 | Nakano | B60T 7/042 |
| | | | | 303/11 |
| 9,108,514 | B2 * | 8/2015 | Kunz | B60T 8/267 |
| 2002/0022918 | A1 * | 2/2002 | Nakano | B60T 7/042 |
| | | | | 701/70 |
| 2004/0260486 | A1 | 12/2004 | Buschmann et al. | |
| 2005/0017579 | A1 * | 1/2005 | Schmitt | 303/147 |
| 2005/0269875 | A1 * | 12/2005 | Maki | B60L 7/26 |
| | | | | 303/152 |
| 2006/0049689 | A1 * | 3/2006 | Marlhe et al. | 303/113.1 |
| 2010/0292902 | A1 * | 11/2010 | Bach et al. | 701/70 |
| 2010/0308646 | A1 * | 12/2010 | Shimizu | B60T 8/17616 |
| | | | | 303/116.2 |
| 2012/0290183 | A1 * | 11/2012 | Strehle et al. | 701/70 |

FOREIGN PATENT DOCUMENTS

| | | | | |
|---|---|---|---|---|
| DE | 3601914 | | 7/1987 | |
| DE | 197 29 097 | | 1/1999 | |
| DE | GB 2357817 A | * | 7/2001 | .............. B60T 7/042 |
| DE | 10224590 | | 2/2003 | |
| DE | 10235373 | | 2/2004 | |
| DE | 10342937 | | 4/2005 | |
| DE | 102009001401 | | 9/2010 | |
| EP | 0937618 | | 8/1999 | |
| GB | 2173269 | | 10/1986 | |
| GB | 2367869 | | 4/2002 | |
| JP | 2005-505470 | | 2/2005 | |
| JP | 2005-254898 | | 9/2005 | |
| JP | 2009-166693 | | 7/2009 | |
| JP | 2011-521842 | | 7/2011 | |
| WO | WO9739931 | | 10/1997 | |
| WO | WO0172568 | | 10/2001 | |
| WO | WO03053755 | | 7/2003 | |
| WO | WO 2009/149977 | | 12/2009 | |
| WO | WO 2009/150032 | | 12/2009 | |

* cited by examiner

CONTROL DEVICE FOR A BRAKING SYSTEM OF A VEHICLE, BRAKING SYSTEM, AND METHOD FOR OPERATING A BRAKING SYSTEM FOR A VEHICLE

FIELD OF THE INVENTION

The present invention relates to a control device for a braking system of a vehicle and a braking system having this type of control device. Moreover, the present invention relates to a method for operating a braking system for a vehicle.

BACKGROUND INFORMATION

Braking systems for motor vehicles having two independent (separate) hydraulic brake circuits are known from the related art. Due to the independent design of the two brake circuits, in the event of a circuit failure due to a brake circuit defect it should still be possible to ensure at least minimum functioning of the braking system, and thus prevent a total failure of the braking system.

A method for ascertaining a malfunction of a pressure sensor or a brake circuit of a hydraulic vehicle braking system having two brake circuits is described in German Published Patent Application No. 102 24 590, for example. The malfunction or the failure is recognizable by comparing a hydraulic pressure ascertained with the aid of the pressure sensor in a pressure chamber of a main brake cylinder (or a variable derived therefrom) to a vacuum pressure of at least one vacuum sensor situated at a vacuum brake booster (or a variable derived therefrom). After the malfunction or failure is recognized, a shutoff valve situated in a hydraulic line between the main brake cylinder and the still functional brake circuit is closed, and at least one wheel brake of the still functional brake circuit is subsequently acted on by pressure with the aid of a hydraulic pump. In this way, the aim is for hydraulic brake boosting to be producible despite the malfunction or the failure.

SUMMARY

The present invention provides a control device for a braking system of a vehicle, a braking system for a vehicle, and a method for operating a braking system for a vehicle.

The present invention allows additional volume to be conveyed into the second brake circuit for the additional brake boosting, in particular in order to ensure the deceleration required by regulation, even in the event of a fault. For example, a defect in the first brake circuit during the establishment of the setpoint additional volume is recognized by comparing the at least one setpoint variable to the at least one actual variable, and additional brake boosting is subsequently activated in the second brake circuit. The functional impairment of the first brake circuit, in particular a circuit failure, may be compensated for in this way.

Moreover, it is also possible with the aid of the present invention to compensate for air that is present in the second brake circuit by suitably establishing the setpoint additional volume, taking into account the elasticity variable. Customarily, the volume intake of a standard braking system is greatly increased by the presence of air (in the at least one brake circuit). This may result in a functional impairment of the affected brake circuits. This functional impairment is preventable with the aid of the present invention. For this reason, the present invention is advantageously usable in particular in by-wire braking systems and braking systems having aged brake fluid.

For a vehicle having the control device according to the present invention, the braking system equipped with same, and a vehicle operation using the corresponding method, the minimum vehicle deceleration required by regulation is easily ensured in error-free normal operation as well as in the event of a fault, in particular in the event of a failure of the front axle circuit. For example, in the event of a circuit failure the motor vehicle may bring about a vehicle deceleration of at least 2.44 m/s$^2$. Thus, the driver may reliably and conveniently brake the vehicle, even after a functional impairment.

The main brake cylinder braking mode is understood to mean a mode/state of the second brake circuit in which the second brake circuit is connected to the main brake cylinder in such a way that the driver is still able to brake the at least one second wheel brake cylinder via a pressure buildup in the main brake cylinder. Thus, in one embodiment of the present invention it is not necessary to close a shutoff valve between the main brake cylinder and the second brake circuit prior to transferring the actual additional volume. Instead, the present invention may also be carried out when this type of shutoff valve is present in an at least partially opened state, in particular in the opened state. In the present invention, the driver still has direct access to the second brake circuit. The driver may thus control/actively adjust the brake pressure that is present in the at least one second wheel brake cylinder after or during the transfer of the actual additional volume. In other words, via the applied pedal travel/pedal pressure and the applied counterforce the driver may regulate the pressure in the second (intact) brake circuit with respect to the increased counterpressure from the at least one volume conveying device, such as a pump and/or a plunger.

It is pointed out here that the present invention provides for a transfer of an additional brake fluid volume into the second brake circuit, which is hydraulically connected to the main brake cylinder and in which braking may still be carried out via the main brake cylinder, while in the conventional method a brake pressure is actively set by regulation in an intact brake circuit with a closed shutoff valve. Thus, in contrast to the regulation with the shutoff valve closed, the driver may quickly change the brake pressure which has built up in the at least one second wheel brake cylinder, without the need for a complicated or expensive electronics system.

In addition, compared to the conventional method, the present invention requires no vacuum sensor. The present invention may thus also be carried out in a braking system without vacuum boost. Thus, since no signal of a vacuum sensor is necessary for applying the present invention, implementability below the booster control point is ensured.

While the conventional method results in a by-wire brake circuit in which a pressure reduction is possible only by regulation via the continuously adjustable valve, in the present invention it is not necessary to actively regulate the pressure in the second (remaining intact) brake circuit above the pressure level generated by the driver, based on the estimated braking input. Thus, an electronics system which is less expensive and which requires less installation space is also applicable for the implementability of the present invention.

DETAILED DESCRIPTION

Figure 1:
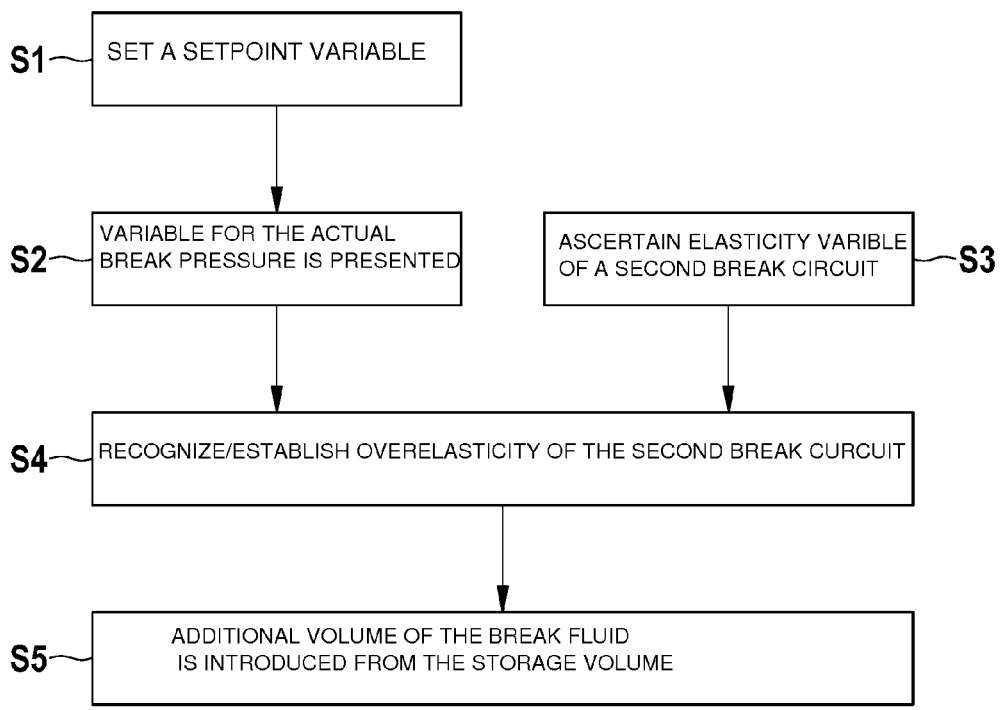
FIG. 1 shows a flow chart for explaining a first specific embodiment of the method for operating a braking system.

FIG. 1 shows a flow chart for explaining a first specific embodiment of the method for operating a braking system.

The method described below may be carried out using a braking system which includes a main brake cylinder, a storage volume, external to the brake circuit, which is fillable with a brake fluid, a first brake circuit having at least one first wheel brake cylinder, a second brake circuit having at least one second wheel brake cylinder, and at least one volume conveying device. The at least one volume conveying device may be a pump and/or a plunger, for example.

The at least one second brake circuit is operable at least in a main brake cylinder braking mode in which a pressure in the second brake circuit is controllable with the aid of the main brake cylinder. This may be understood to mean that the driver has the option of braking the second brake circuit which is in the main brake cylinder braking mode by activating a brake activation element, for example a brake pedal, situated at the main brake cylinder via a pressure buildup in the main brake cylinder. This type of braking may be understood to mean a buildup of a brake pressure in the at least one second wheel brake cylinder of the second brake circuit. The first brake circuit may also be operable in this type of main brake cylinder braking mode.

In addition to the main brake cylinder braking mode, the second brake circuit may also be operable in a nonmuscular energy braking mode in which a hydraulic connection between the main brake cylinder and the second brake circuit, which is in the main brake cylinder braking mode, is closed/prevented, and the brake pressure that is present in the at least one second wheel brake cylinder of the second brake circuit is independent of an internal pressure of the main brake cylinder. However, the applicability of the method described below is not limited to an operability of the second brake circuit in this type of nonmuscular energy braking mode. Likewise, the first brake circuit may be operable solely in a nonmuscular energy braking mode in which a brake pressure that is present in the first brake circuit is independent of an internal pressure of the main brake cylinder, or may selectively be operable in a main brake cylinder braking mode or a nonmuscular energy braking mode. The method described below may thus be carried out using many different types of braking systems.

The method may include a method step S1, in which at least one setpoint variable regarding a setpoint brake pressure to be set in the first brake circuit and/or in the at least one first wheel brake cylinder is ascertained. For example, at least one braking distance and/or one brake pressure of an activation of the brake activation element may be ascertained by a driver of the vehicle as the at least one first setpoint variable. This may be understood to mean a variable which corresponds to the braking distance and/or the brake pressure, for example a displacement travel (rod travel) of a connecting component situated between the main brake cylinder and the brake activation element and/or a pressure applied to the connecting component. A rod travel speed is also ascertainable as an actual variable. The setpoint variable regarding the setpoint brake pressure to be set in the first brake circuit and/or in the m at least one first wheel brake cylinder may also be a pressure that is present in the second brake circuit and/or in the at least one second wheel brake cylinder, provided that the same pressure conditions are to be present in both brake circuits.

Together with method step S1, the method may also include a method step S2 in which at least one actual variable regarding an actual brake pressure that is present in the first brake circuit and/or in the at least one first wheel brake cylinder, and/or regarding an actual braking torque that is exerted on at least one wheel by the at least one first wheel brake cylinder, is ascertained. For example, a pressure that is present in the first brake circuit and/or in the at least one first wheel brake cylinder, or a variable derived therefrom, is ascertained as the at least one actual variable regarding the present actual brake pressure. Likewise, a change over time of a rotational speed of a wheel associated with the second wheel brake cylinder may be ascertained as the at least one actual variable regarding the actual braking torque exerted on at least one wheel by the at least one first wheel brake cylinder. However, it is also possible to ascertain an instantaneous vehicle deceleration, based on the variation over time of the vehicle speed, as the at least one actual variable.

Thus, for carrying out method steps S1 and S2 there is a large selection for the sensor values which are ascertainable as the setpoint variable and as the actual variable. Sensors which are generally already present on a vehicle may be used for carrying out method steps S1 and S2. Thus, carrying out the method described here requires no additional sensors to be installed on the vehicle.

The indications of method steps S1 and S2 do not specify a chronological sequence for carrying out these method steps. For example, method step S2 may also be carried out prior to method step S1 or simultaneously with same.

As an alternative or in addition to method steps S1 and S2, the method may also include method step S3. An elasticity variable regarding an elasticity of the second brake circuit may be ascertained in method step S3. This type of elasticity variable may be understood to mean, for example, a variable regarding a relationship between at least one volume difference of the second brake circuit and/or of a pressure chamber of the main brake cylinder connected to the second brake circuit, and a pressure difference in the second brake circuit. The elasticity variable may also be the volume difference of the second brake circuit and/or of a pressure chamber of the main brake cylinder connected to the second brake circuit, at different system pressures. Since methods for determining this type of elasticity variable/elasticity of the second brake circuit are known from the related art, they are not discussed in greater detail here.

A default variable regarding a setpoint additional volume of the brake fluid of the second brake circuit which is in the main brake cylinder braking mode is established in a method step S4. The default variable may include, for example, the setpoint additional volume, a pump frequency, pump work, a pump power, a plunger control variable, and/or a setpoint energization of the at least one volume conveying device of the braking system.

The default variable may be established, for example, by taking into account a first deviation variable of the at least one actual variable from the at least one setpoint variable. The first deviation variable may be, for example, a difference of the at least one actual variable from the at least one setpoint variable. Further options for ascertaining the first deviation variable are likewise possible. Furthermore, in addition to the first deviation variable, a difference between the at least one actual variable and a predefined minimum variable may be taken into account in establishing the default variable/the setpoint additional volume. In particular, a setpoint additional volume may be established only when the difference is not equal to zero.

Alternatively or additionally, the default variable may be established by taking into account a second deviation variable of the at least one elasticity variable from a predefined setpoint elasticity variable. The setpoint elasticity variable may be specified in such a way that an elasticity variable which differs from the predefined setpoint elasticity variable occurs when there is an increased brake circuit elasticity, i.e., when there is an increase in the brake fluid volume that is present/required in the second brake circuit, in particular when air is in the second brake circuit.

Thus, with the aid of method step S4, a functional impairment of the first brake circuit, for example due to an escape of brake fluid from the first brake circuit, may also be indirectly determinable as a functional impairment of the second brake circuit when there is an increase in the brake fluid volume/brake fluid requirement that is present in the second brake circuit, in particular due to air in the second brake circuit. However, it is pointed out that the functional impairment of the first brake circuit and/or the increased elasticity of the second brake circuit does not have to be "recognized" (ad hoc), but, rather, may be automatically compensated for. This is another advantage of the method. By suitably establishing the default variable/the setpoint additional volume, the functional impairment of the first brake circuit, such as a circuit failure and/or the air present in the second brake circuit, may be compensated for as described in greater detail below.

In addition to a setpoint additional volume which is not equal to zero, an error state of the first brake circuit and/or an overelasticity of the second brake circuit may also optionally be recognized/established in method step S4. No further method steps need be carried out for this type of circuit failure recognition. The recognized/established error state of the first brake circuit and/or the overelasticity of the second brake circuit may be subsequently communicated to the driver and/or to a vehicle repair shop with the aid of an information display, an audio output, and/or a radio signal. In addition to a reliable deceleration of the vehicle, the driver has the option of being informed of the states of the braking system and to remedy same in a timely manner.

In a further method step S5, an actual additional volume of the brake fluid corresponding to the established default variable/the setpoint additional volume is introduced from the storage volume, situated outside the second brake circuit, into the second brake circuit which is in the main brake cylinder braking mode, with the aid of the at least one volume conveying device. In one advantageous specific embodiment, the actual additional volume of the brake fluid is transferred, with the aid of the at least one volume conveying device, from the storage volume via a reservoir line which connects the second brake circuit parallel to the main brake cylinder to the storage volume into the second brake circuit which is in the main brake cylinder braking mode.

Alternatively, a sealing device of a replacement borehole which connects the storage volume to the main brake cylinder may be at least partially opened, preferably completely opened. This may be easily carried out, for example, by overflowing the sealing device. The actual additional volume of the brake fluid may be subsequently transferred with the aid of the at least one volume conveying device from the storage volume into the second brake circuit which is in the main brake cylinder braking mode, via the at least partially opened sealing device (and at least one pressure chamber of the main brake cylinder).

It is pointed out that the implementability of method step S5 does not require disconnecting the second brake circuit by closing a shutoff valve situated between the second brake circuit and the main brake cylinder. Thus, the driver also has the option to directly brake the second brake circuit during method step S5 and/or after method step S5. Likewise, a pressure reduction in the second brake circuit may also be carried out after method step S5, in that the brake fluid is displaced in a simple manner from the second brake circuit into the main brake cylinder by the driver releasing the brake pedal.

The present method thus allows a compensation for a functional impairment of the first brake circuit and/or of a brake circuit elasticity of the second brake circuit which differs from the setpoint elasticity variable. At the same time, it is ensured that the second brake circuit is still hydraulically connected to the main brake cylinder, and an additional brake pressure buildup in the second brake circuit with the aid of a pressure buildup in the main brake cylinder is thus quickly, reliably, and easily carried out by the driver via the hydraulic connection between the second brake circuit and the main brake cylinder. This is a significant advantage which is ensured for the second brake circuit in the method described here, but which is not present for a by-wire brake circuit.

Figure 2:
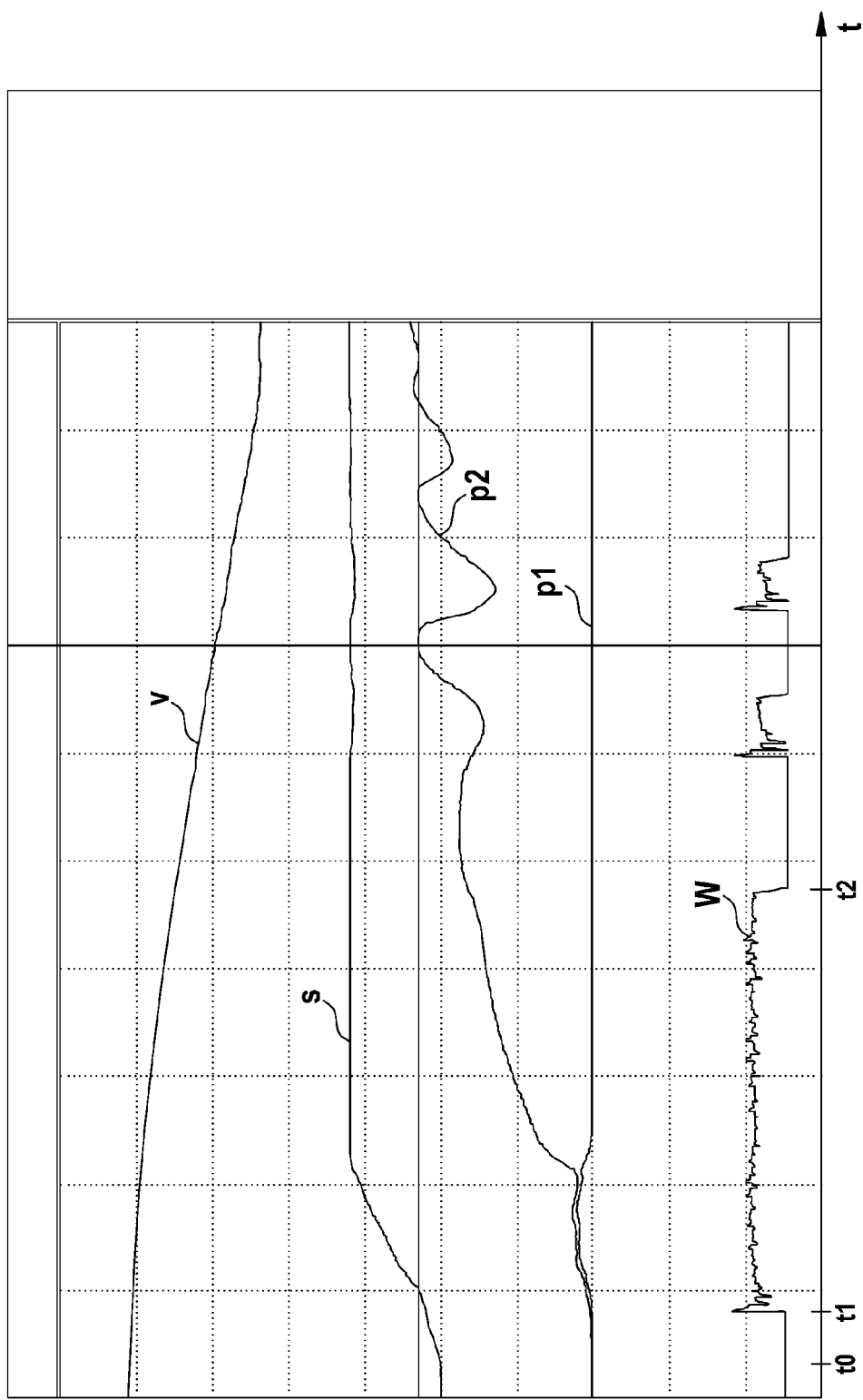
FIG. 2 shows a coordinate system for illustrating a second specific embodiment of the method for operating a braking system.

FIG. 2 shows a coordinate system for illustrating a second specific embodiment of the method for operating a braking system.

The abscissa of the coordinate system corresponds to a time t. The ordinate of the coordinate system depicts a vehicle speed v (in m/s), a brake pedal travel s (in mm), a first brake pressure p1 (in bar) in a first brake circuit on a front axle of a vehicle, a second brake pressure p2 (in bar) in a second brake circuit on a rear axle of the vehicle, and delivery work W of a volume conveying device of the braking system, for example a pump.

In the braking system used for carrying out the method, a functional impairment of the first brake circuit, via which in the error-free state of the braking system the wheels of the front axle are brakeable, is present. This functional impairment may be recognized either prior to point in time t0 or between times t0 and t1 with the aid of the above-described method steps, for example by ascertaining the actual variable and the setpoint variable and comparing the ascertained values to one another. Since the method steps for ascertaining the actual variable and the setpoint variable, for recognizing the functional impairment of the first brake circuit, and for establishing a corresponding setpoint additional volume of the second brake circuit which is in the above-mentioned main brake cylinder braking mode have already been described, they are not discussed again here. It is only pointed out that the method steps may be carried out quickly enough that the response by the braking system, described below, to the established setpoint additional volume of the second brake circuit experiences little or no impairment, whether the method steps have already been carried out prior to point in time t0 or between times t0 and t1.

Beginning at point in time t0, the driver depresses the brake pedal. Thus, a brake pedal travel which is not equal to zero is present beginning at point in time t0.

Beginning at point in time t1, the volume conveying device is controlled in such a way that, with the aid of the volume conveying device, an actual additional volume which corresponds to the (indirectly) established setpoint additional volume is introduced into the second brake circuit. For this purpose it is not necessary to directly establish the setpoint additional volume. Instead, a simpler method may be carried out by establishing as the default variable an activation signal of the at least one volume conveying device and/or a setpoint pressure to be set in the second brake circuit. Thus, beginning at time t1, delivery work W has values which are not equal to 0. Accordingly, second brake pressure p2 of the second brake circuit greatly increases beginning at time t1. Thus, as is apparent based on decreasing vehicle speed v, the vehicle is reliably deceleratable despite low first brake pressure p1.

A deactivation of the at least one volume conveying device may occur only after the setpoint pressure in the second brake circuit which is established as the default variable is ascertained. Second brake pressure p2 of the second brake circuit may thus also be increased by activating the volume conveying device with a constant brake pedal travel s, for example when the volume to be displaced is depleted from the main brake cylinder (limit stop).

A desired vehicle deceleration is achieved beginning at time t2.

Figure 3:
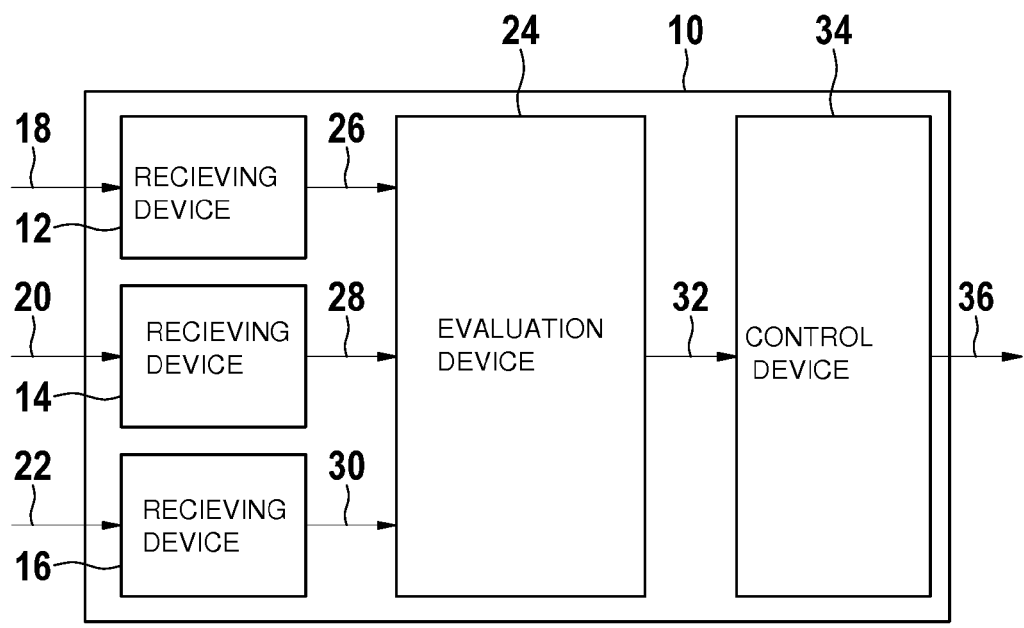
FIG. 3 shows a schematic illustration of one specific embodiment of the control device.

FIG. 3 shows a schematic illustration of one specific embodiment of the control device.

The schematically illustrated control device 10 is usable for a braking system (not illustrated) of a vehicle. Control device 10 includes a first receiving device 12 and a second receiving device 14 and/or a third receiving device 16. In the illustrated specific embodiment, control device 10 has three receiving devices 12 through 16. However, control device 10 is not limited to being equipped with all three receiving devices 12 through 16. Thus, in the design of control device 10 there is great freedom regarding the equipment version with at least one receiving device 12 through 16.

At least one provided setpoint variable regarding a setpoint brake pressure to be set in a first brake circuit of the braking system and/or in at least one first wheel brake cylinder of the first brake circuit is receivable with the aid of first receiving device 12. For example, at least one sensor signal 18 of a braking distance sensor and/or of a brake pressure sensor may be receivable as the at least one setpoint variable. The at least one sensor signal 18 may include a braking distance/displacement travel, a time derivative of the braking distance/displacement travel, a brake pressure, and/or a time derivative of the brake pressure.

Second receiving device 14 is designed in such a way that at least one provided actual variable regarding an actual brake pressure that is present in the first brake circuit and/or in the at least one first wheel brake cylinder, and/or regarding an actual braking torque exerted on at least one wheel by the least one first wheel brake cylinder, is receivable with the aid of second receiving device 14. In particular, at least one output signal 20 of a brake pressure sensor, of a wheel speed sensor, and/or of a vehicle speed sensor is receivable as the at least one actual variable. Thus, output signal 20 may include a brake pressure, a time derivative of the brake pressure, a wheel speed, a time derivative of the wheel speed, a vehicle speed, and/or a time derivative of the vehicle speed.

An elasticity variable regarding an elasticity of a second brake circuit of the braking system is receivable with the aid of third receiving device 16. The elasticity variable may be understood to mean a variable, received via an elasticity signal 22, regarding a relationship of at least one volume difference of the second brake circuit and/or of a main brake cylinder chamber connected to the second brake circuit and a pressure difference in the second brake circuit. (In one refinement, the pressure that is present in the second brake circuit may also be receivable with the aid of third receiving device 16 or another receiving device.)

Control device 10 includes an evaluation device 24, with the aid of which a default variable regarding a setpoint additional volume of a brake fluid of the second brake circuit which is in a main brake cylinder braking mode is establishable. The default variable may be, for example, the setpoint additional volume, a pump frequency, pump work, a pump power, a plunger control variable, and/or a setpoint energization of the at least one volume conveying device of the braking system, for example a pump and/or a plunger. The main brake cylinder braking mode may be understood to mean a mode of the second brake circuit in which a pressure in the second brake circuit is controllable by the driver with the aid of a main brake cylinder of the braking system, for example via a pressure increase or a pressure reduction in the main brake cylinder chamber which is hydraulically connected to the second brake circuit.

The default variable/the setpoint additional volume may be established with the aid of evaluation device 24, by taking into account a first deviation variable of the at least one actual variable from the at least one setpoint variable, and/or by taking into account a second deviation variable of the elasticity variable from a predefined setpoint elasticity variable. For this purpose, evaluation device 24 receives, for example, a setpoint variable signal 26 and an actual variable signal 28, and subsequently establishes the first deviation variable, in particular as a difference. Likewise, after receiving an elasticity variable signal 30, evaluation device 24 may establish the second deviation variable as the difference of the elasticity variable from the predefined setpoint elasticity variable.

Evaluation device 24 subsequently outputs a default signal 32, corresponding to the established default variable/the setpoint additional volume, to a control device 34. With the aid of control device 34, a control signal 36 corresponding to the established setpoint additional volume is outputtable to at least one volume conveying device of the braking system in such a way that an actual additional volume of the brake fluid corresponding to the setpoint additional volume is introducible into the second brake circuit which is in the main brake cylinder braking mode from a storage volume, external to the brake circuit, of the braking system with the aid of the at least one volume conveying device. This ensures the above-described advantages.

Figure 4:
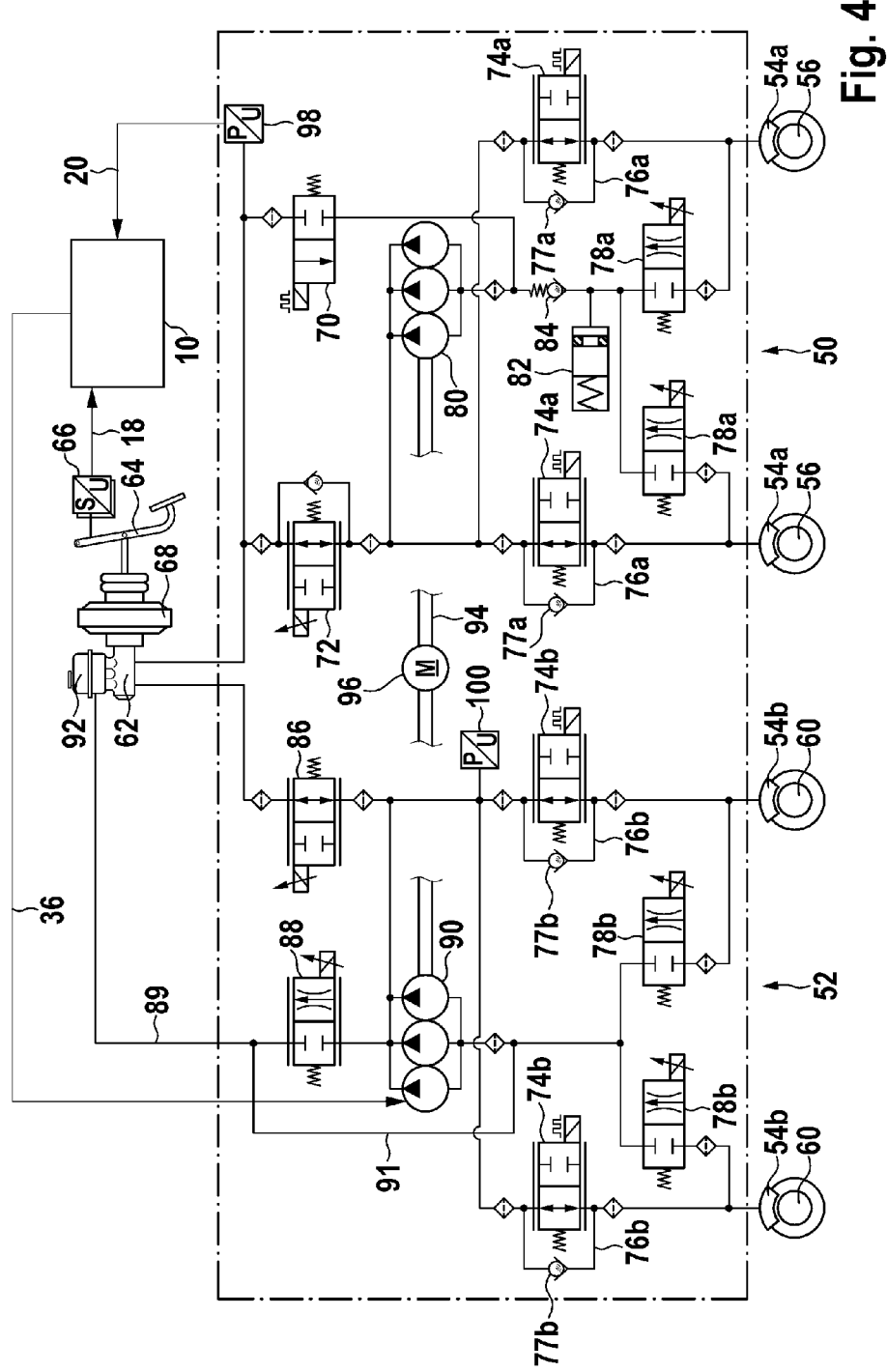
FIG. 4 shows a schematic illustration of one specific embodiment of the braking system.

FIG. 4 shows a schematic illustration of one specific embodiment of the braking system.

The braking system depicted schematically in FIG. 4 having above-described control device 10 has a first brake circuit 50 and a second brake circuit 52, each having two wheel brake cylinders 54a and 54b, respectively. Two wheels 56 situated on the front axle are associated with the two wheel brake cylinders 54a of first brake circuit 50. A generator (not illustrated) may also be situated on the front axle. Wheels 60 on the rear axle are associated with the two wheel brake cylinders 54b of second brake circuit 52. However, the braking system described here is not limited to an axle-specific brake circuit distribution. Instead, the braking system is also usable when wheels 56 and 60 associated with a shared brake circuit 50 or 52 are situated on one side of the vehicle, or diagonally on the vehicle.

It is expressly pointed out that the components of the braking system described below represent only one example of a possible design of the advantageous braking system having control device 10. A primary advantage of the braking system is that brake circuits 50 and 52 are not limited to a certain design or to the use of certain components. Instead, brake circuits 50 and 52 may be modified with a great freedom of choice without compromising the advantages of equipping the braking system with control device 10.

The braking system has a brake input element 64, for example a brake pedal, situated at a main brake cylinder 62. A braking distance sensor 66 may be situated at brake input element 64 for providing the setpoint value. A brake force sensor/brake pressure sensor may be used as an alternative to braking distance sensor 66. Optionally, the braking system may also include a brake booster 68, for example a hydraulic brake booster or an electromechanical brake booster.

First brake circuit 50 having a main switching valve 70 and a changeover valve 72 is designed in such a way that the driver may directly brake wheel brake cylinders 54a of first brake circuit 50 via main brake cylinder 62. A wheel inlet valve 74a having a bypass line 76a extending in parallel thereto, a check valve 77a situated in each bypass line 76a, and a wheel outlet valve 78a are associated with each of the two wheel brake cylinders 54a of first brake circuit 50. In addition, first brake circuit 50 includes a first pump 80 whose suction side is connected to wheel outlet valves 78a and whose pressure side is oriented toward changeover valve 72, a storage chamber 82 coupled between wheel outlet valves 78a and pump 80, and a pressure relief valve 84 situated between first pump 80 and storage chamber 82.

Second brake circuit 52 is designed as a brake circuit which is decoupleable from main brake cylinder 62. For this purpose, second brake circuit 52 has a shutoff valve 86, with the aid of which wheel brake cylinders 54b of second brake circuit 52, wheel inlet valves 74b associated with wheel brake cylinders 54b together with bypass lines 76b situated in parallel and having check valves 77b, and wheel outlet valves 78b associated with wheel brake cylinders 54b are decoupleable from main brake cylinder 62. By closing shutoff valve 86, the actuation of brake input element 64 may be prevented from causing an increase in the brake pressure in wheel brake cylinders 54b of second brake circuit 52. This is particularly advantageous when the generator is to be used for charging the vehicle battery (not illustrated) during a braking operation. Since the generator exerts an additional generator braking torque on the vehicle, by decoupling wheel brake cylinders 54b of second brake circuit 52 the overall deceleration of the vehicle may be prevented from being greater than a setpoint vehicle deceleration that is predefined by the driver.

In addition, second brake circuit 52 has a continuously regulatable/adjustable/controllable valve 88 and a second pump 90. Continuously controllable valve 88 is hydraulically connected via a reservoir line 89 to a brake medium reservoir 92 at main brake cylinder 62. Brake medium reservoir 92 represents only one example of a storage volume which is fillable with a brake fluid of the braking system and usable in the braking system. As an alternative to brake medium reservoir 92, a storage volume having a different design may also be used for use of control device 10, the storage volume preferably being externally situated and/or not a component of second brake circuit 52.

The suction side of second pump 90 is likewise hydraulically connected to brake medium reservoir 92 via a line 91, which runs in parallel to the continuously controllable valve 88 and second pump 90, and reservoir line 89 in such a way that after shutoff valve 86 is closed, a volume of brake medium is dischargeable into wheel brake cylinders 54b of second brake circuit 52 via (at least partially opened) wheel inlet valves 74b with the aid of second pump 90. The pressure side of second pump 90 is connected via continuously controllable valve 88 to brake medium reservoir 92 in such a way that after shutoff valve 86 is closed, a volume of brake medium is pumpable from wheel brake cylinders 54b of second brake circuit 52 into brake medium reservoir 92 via (at least partially opened) wheel outlet valves 78b and (at least partially opened) continuously controllable valve 88. Thus, after shutoff valve 86 is closed, the hydraulic braking torque of wheel brake cylinders 54b of second brake circuit 52 may be actively set with the aid of second pump 90 and continuously controllable valve 88. In particular, the hydraulic braking torque of wheel brake cylinders 54b of second brake circuit 52 which are decoupled from main brake cylinder 62 may be set to correspond to a difference between a setpoint total braking torque predefined by the driver and an actual total braking torque composed of the generator braking torque of the generator and the hydraulic braking torque of wheel brake cylinders 54a of first brake circuit 50.

Pumps 80 and 90 may each be situated as three-piston pumps on a shared shaft 94 of a motor 96. For example, other types of pumps besides three-piston pumps are also usable for pumps 80 and 90. Pump 90 is only one example of a usable volume conveying device.

Instead of or in addition to pump 90, the braking system may include a different volume conveying device, for example a plunger.

Components 70 through 96 of the braking system described in the above paragraphs merely represent examples of equipping a braking system with control device 10, described in greater detail below.

Second brake circuit 52 is operable in a main brake cylinder braking mode in which a pressure in second brake circuit 52 is controllable with the aid of main brake cylinder 62. The main brake cylinder braking mode of second brake circuit 52 is present when shutoff valve 86 is controlled at least into a partially opened state. In particular, second brake circuit 52 is in the main brake cylinder braking mode when shutoff valve 86 is open.

By closing shutoff valve 86, second brake circuit 52 is additionally controllable into a nonmuscular energy braking mode in which a brake pressure that is present in second brake circuit 52 is actively settable with the aid of second pump 90 and continuously adjustable valve 88. The nonmuscular energy braking mode of second brake circuit 52 may be utilized, for example, to blend a recuperative braking torque of the generator exerted on the axle of wheels 56 of the first brake circuit. For this purpose, the brake pressure in second brake circuit 52 may be actively set with the aid of second pump 90 and continuously adjustable valve 88 in such a way that the brake pressure corresponds to a difference between a preferred overall braking torque and the sum of the hydraulic braking torques and the recuperative braking torques exerted on wheels 56 of first brake circuit 50. Thus, the braking system described here is also advantageously usable in particular in an electric vehicle or in a hybrid vehicle.

Each of the two brake circuits 50 and 52 has at least one pressure sensor 98 through 100, respectively, which is designed for ascertaining a circuit pressure and/or a wheel pressure. Thus, a piece of information/variable regarding an actual brake pressure that is present in associated brake circuit 50 or 52, or in associated wheel brake cylinders 56 and 60, respectively, is ascertainable/measurable. The piece of information/variable ascertained by pressure sensor 98 of first brake circuit 50 regarding the actual brake pressure that is present in the first brake circuit 50 or in wheel brake cylinders 54a is providable to control device 10 as output signal 20/actual variable.

The actual variable provided by sensor 98 is receivable with the aid of control device 10. As an alternative or in addition to the actual variable of sensor 98, other actual variables regarding an actual braking torque exerted on at least one wheel 56 by at least one wheel brake cylinder 54a are receivable with the aid of control device 10. Control device 10 is additionally designed to receive a setpoint variable provided by sensor 66 via a sensor signal 18. (Optionally, control device 10 is also designed to receive an elasticity variable regarding an elasticity of second brake circuit 52, which, however, is not described below.)

Control device 10 is designed to establish the above-described default variable regarding a setpoint additional volume of the brake fluid in second brake circuit 52 which is in the main brake cylinder braking mode, by taking into account the at least one setpoint variable and the at least one actual variable. (Optionally, the at least one elasticity variable may also be taken into account in establishing the default variable/the setpoint additional volume.) Furthermore, control device 10 is designed to control pump 90 with the aid of control signal 36 in such a way that an actual additional volume of the brake fluid corresponding to the established setpoint additional volume is pumpable from brake medium reservoir 92 into second brake circuit 52. (For this purpose, a plunger may be used instead of or in addition to pump 90.) This may be understood as filling of second brake circuit 62 from brake medium reservoir 92. This may be carried out while second brake circuit 52 is in the main brake cylinder braking mode, due to the presence of shutoff valve 86 in at least a partially opened state. The above-mentioned advantages are thus achievable with the aid of control device 10. The implementability is not limited to the illustrated modulation system; rather, it may be transferred to modulation systems which allow an external volume to be conveyed into at least second brake circuit 52.

In the illustrated specific embodiment, second brake circuit 52 is connected to brake medium reservoir 92 via reservoir line 89 which extends in parallel to main brake cylinder 62. In this case, with the aid of pump 90 the actual additional volume may be pumped from brake medium reservoir 92 into second brake circuit 52 via reservoir line 89 while the second brake circuit is in the main brake cylinder braking mode. (The actual additional volume may be displaced in addition to the volume displaced by the driver from main brake cylinder 62 into second brake circuit 52.)

However, the braking system described here is not limited to equipping it with this type of reservoir line. Instead, the actual additional volume may be pumped via a replacement borehole with the aid of a sealing device which connects the storage volume, depicted here as brake medium reservoir 92 as an example, to main brake cylinder 62. This type of replacement borehole may, for example, be a snifter hole having a central valve. Thus, second brake circuit 52 may also be filled with the actual additional volume of the brake fluid via the sealing device, which is controlled in an at least partially opened state, while second brake circuit 52 is in the main brake cylinder braking mode.

In one preferred specific embodiment, main brake cylinder 62 includes a first pressure chamber 102 associated with first brake circuit 50, and a second pressure chamber 104 associated with second brake circuit 52. This may be understood to mean that the supply line of first brake circuit 50 leads to first pressure chamber 102, while the supply line of second brake circuit 52 opens into second pressure chamber 104. A first maximum volume of first pressure chamber 102, which is present if brake activation element 64 is not activated, is advantageously greater than a second maximum volume of second pressure chamber 104, which is assumed if brake activation element 64 is not activated.

The use of control device 10 thus opens the possibility of dimensioning the chamber volume of second brake circuit 52 to be significantly smaller. If second brake circuit 52 is provided in a by-wire system, the chamber volume may in particular be completely dispensed with. This reduction in the second maximum volume of second pressure chamber 104 compared to the first maximum volume of first pressure chamber 102 is achievable while at the same time meeting regulatory requirements. Main brake cylinder 62 which is usable in the braking system may thus be shortened in length. The space requirements of main brake cylinder 62 are reducible in this way. The shorter design of main brake cylinder 62 (in its longitudinal direction) also offers advantages for packaging.

Control device 10 ensures compensation for a functional impairment of first brake circuit 50. Therefore, the braking system does not have to be equipped with complex or error-prone sensors for detecting a leak in first brake circuit 50. (Optionally, overelasticity of second brake circuit 52, for example due to trapped air, may be compensated for with the aid of control device 10, for which reason sensors for detecting air in second brake circuit 52 may be dispensed with.) The robustness of the braking system may be increased in this way.

Predefined switch-off thresholds which in particular specify maximum values, and/or control thresholds which establish preferred value ranges for the pumping rates, may also be taken into account in establishing the setpoint additional volume of second brake circuit 52 and in ouputting control signal 36. Pump 90 may preferably be activated in a noise-optimized operating range, with simultaneous deactivation/switching off of pump 90 when the vehicle is at a standstill.

In one preferred specific embodiment, pump 90 is controlled when a driver braking input is recognized based on the exceedance of a threshold value of the pedal travel, and the brake pressure that is present in first brake circuit 50 is less than a threshold value corresponding to the deceleration required by regulation, or to a higher threshold. This ensures good support of the driver in the lower deceleration range, and at the same time, the best possible modulation capability of the vehicle deceleration in the middle to high deceleration range.

The pump may likewise be controlled if, for example, the pedal travel sensor has recognized a brake activation, but no pressure buildup has been measured at pressure sensor 98 of first brake circuit 50. (Likewise, the actual additional volume may be pumped into second brake circuit 52 if the elasticity of second brake circuit 52 is above a predefined threshold value, and air in second brake circuit 52 or other effects which increase the volume in brakes 54b may be deduced.)

The braking system described here, even for the present axle-specific brake circuit distribution and a possible front axle-loaded distribution of the vehicle weight, ensures reliable deceleration, even in the event of a functional impairment, such as in particular a failure, of first brake circuit 50 and/or when the elasticity of second brake circuit 52 deviates from a normal value range.

What is claimed is:

1. A control device for a braking system of a vehicle, comprising:
    at least one of:
        a first receiving device, wherein, with the aid of the first receiving device, at least one provided setpoint variable regarding a setpoint brake pressure to be set at least one of in a first brake circuit of the braking system and in at least one first wheel brake cylinder of the first brake circuit is receivable;
        a second receiving device, wherein, with the aid of the second receiving device, at least one provided actual variable is receivable regarding at least one of: an actual brake pressure that is present at least one in the first brake circuit and in the at least one first wheel brake cylinder, and an actual braking torque exerted on at least one wheel by the at least one first wheel brake cylinder; and a third receiving device, wherein, with the aid of the third receiving device, an elasticity variable regarding an elasticity of a second brake circuit of the braking system is receivable;

an evaluation device, with the aid of which a default variable regarding a setpoint additional volume of a brake fluid of the second brake circuit which is in a main brake cylinder braking mode is establishable, a pressure in the second brake circuit which is in the main brake cylinder braking mode being controllable with the aid of a main brake cylinder of the braking system, taking into account at least one of a first deviation variable of the at least one actual variable from the at least one setpoint variable and a second deviation variable of the elasticity variable from a predefined setpoint elasticity variable; and a control device, with the aid of which a control signal corresponding to the established default variable is outputtable to at least one volume conveying device of the braking system in such a way that with the aid of the at least one volume conveying device an actual additional volume of the brake fluid corresponding to the setpoint additional volume is introducible from a storage volume of the braking system into the second brake circuit which is in the main brake cylinder braking mode.

2. The control device as recited in claim 1, wherein at least one sensor signal of at least one of a braking distance sensor and a brake pressure sensor is receivable and may be taken into account as the at least one setpoint variable.

3. The control device as recited in claim 1, wherein at least one output signal of at least one of a brake pressure sensor, a wheel speed sensor, and a vehicle speed sensor is receivable and may be taken into account as the at least one actual variable.

4. The control device as recited in claim 1, wherein a variable regarding a relationship of at least one volume difference of at least one of the second brake circuit and a main brake cylinder chamber connected to the second brake circuit and a pressure difference in the second brake circuit is receivable and may be taken into account as the elasticity variable regarding the elasticity of the second brake circuit.

5. A braking system for a vehicle, comprising:
a main brake cylinder;
a storage volume which is fillable with a brake fluid;
a first brake circuit having at least one first wheel brake cylinder and a second brake circuit having at least one second wheel brake cylinder, the second brake circuit being operable at least in a main brake cylinder braking mode in which a pressure in the second brake circuit is controllable with the aid of the main brake cylinder;
at least one volume conveying device;
at least one of:
  (a) a first receiving device using which at least one provided setpoint variable regarding a setpoint brake pressure to be set at least one of in the first brake circuit and in at least one first wheel brake cylinder of the first brake circuit is receivable;
  (b) a second receiving device using which at least one provided actual variable is receivable regarding at least one of (1) an actual brake pressure that is present at least one in the first brake circuit and in the at least one first wheel brake cylinder, and (2) an actual braking torque exerted on at least one wheel by the at least one first wheel brake cylinder; and
  (c) a third receiving device using which an elasticity variable regarding an elasticity of the second brake circuit is receivable;
an evaluation device using which a default variable regarding a setpoint additional volume of a brake fluid of the second brake circuit which is in the main brake cylinder braking mode is establishable, a pressure in the second brake circuit which is in the main brake cylinder braking mode being controllable with the aid of the main brake cylinder, taking into account at least one of a first deviation variable of the at least one actual variable from the at least one setpoint variable and a second deviation variable of the elasticity variable from a predefined setpoint elasticity variable; and
a control device using which a control signal corresponding to the established default variable is outputtable to the at least one volume conveying device in such a way that, with the aid of the at least one volume conveying device, an actual additional volume of the brake fluid corresponding to the setpoint additional volume is introducible from the storage volume into the second brake circuit which is in the main brake cylinder braking mode.

6. The braking system as recited in claim 5, wherein:
the second brake circuit is connected to the storage volume via a reservoir line extending in parallel to the main brake cylinder, and
with the aid of the at least one volume conveying device, the actual additional volume of the brake fluid is introducible from the storage volume via the reservoir line into the second brake circuit which is in the main brake cylinder braking mode.

7. The braking system as recited in claim 5, wherein:
the storage volume is connected to the main brake cylinder via a replacement borehole having a sealing device, and
with the aid of the at least one volume conveying device, the actual additional volume of the brake fluid is introducible from the storage volume into the second brake circuit which is in the main brake cylinder braking mode via the sealing device, which is controlled into an at least partially opened state.

8. The braking system as recited in claim 5, wherein:
the main brake cylinder includes a first pressure chamber associated with the first brake circuit and a second pressure chamber associated with the second brake circuit, and
a first maximum volume of the first pressure chamber is larger than a second maximum volume of the second pressure chamber.

9. A method for operating a braking system for a vehicle, having a main brake cylinder, a storage volume which is fillable with a brake fluid, a first brake circuit having at least one first wheel brake cylinder, a second brake circuit having at least one second wheel brake cylinder, the second brake circuit being operable at least in a main brake cylinder braking mode in which a pressure in the second brake circuit is controllable with the aid of the main brake cylinder, and at least one volume conveying device, comprising the steps of:
ascertaining at least one of:
  at least one setpoint variable regarding a setpoint brake pressure to be set at least one of in the first brake circuit and in the at least one first wheel brake cylinder;
  at least one actual variable regarding at least one of: an actual brake pressure present at least one of in the first brake circuit and in the at least one first wheel brake cylinder, and an actual braking torque exerted on at least one wheel by the at least one first wheel brake cylinder; and an elasticity variable regarding an elasticity of the second brake circuit;

establishing a default variable regarding a setpoint additional volume of the brake fluid of the second brake circuit which is in the main brake cylinder braking mode, by taking into account at least one of a first deviation variable of the at least one actual variable from the at least one setpoint variable and a second deviation variable of the elasticity variable from a predefined setpoint elasticity variable; and introducing an actual additional volume of the brake fluid corresponding to the default variable from the storage volume into the second brake circuit which is in the main brake cylinder braking mode with the aid of the at least one volume conveying device.

10. The method as recited in claim 9, wherein the actual additional volume of the brake fluid is introduced into the second brake circuit which is in the main brake cylinder braking mode with the aid of the at least one volume conveying device from the storage volume via a reservoir line which connects the second brake circuit to the storage volume in parallel to the main brake cylinder.

11. The method as recited in claim 9, wherein a sealing device of a replacement borehole which connects the storage volume to the main brake cylinder is at least partially opened, and with the aid of the at least one volume conveying device the actual additional volume of the brake fluid is introduced from the storage volume via the at least partially opened sealing device into the second brake circuit which is in the main brake cylinder braking mode.

12. The method as recited in claim 9, wherein at least one of at least one braking distance and a brake pressure of an activation of a brake activation element is ascertained by a driver of the vehicle as the at least one setpoint variable.

13. The method as recited in claim 9, wherein at least one of: at least one pressure in at least one of the first brake circuit and the at least one first wheel brake cylinder, a change over time of a rotational speed of a wheel, and a vehicle deceleration is ascertained as the at least one actual variable.

14. The method as recited in claim 9, wherein a variable regarding a relationship of at least one volume difference of at least one of the second brake circuit and a pressure chamber of the main brake cylinder connected to the second brake circuit and a pressure difference in the second brake circuit is ascertained as the elasticity variable regarding the elasticity of the second brake circuit.

* * * * *